(No Model.)
J. A. & L. R. SYMMES.
HAY OR GRAIN COCK WEATHER SHIELD.
No. 388,795. Patented Aug. 28, 1888.
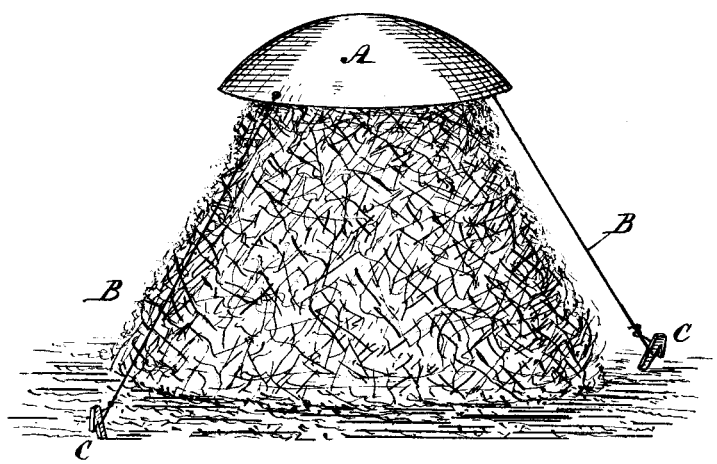
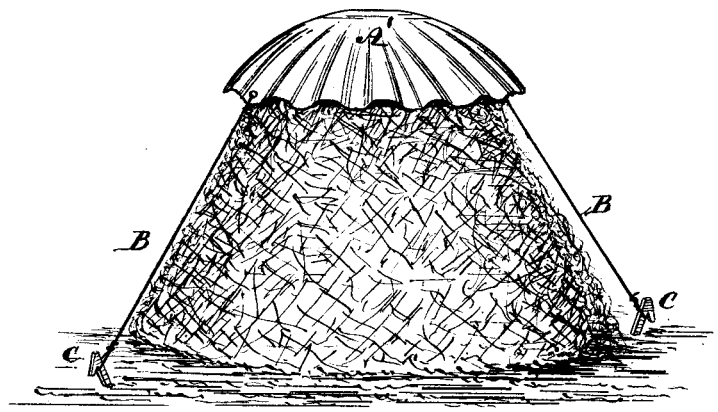
Witnesses:
John Grist,
Wm. L. Magee
Inventors:
J. A. Symmes,
L. R. Symmes,
By Henry Grist,
Attorney.

UNITED STATES PATENT OFFICE.

JOHN A. SYMMES AND LUTHER R. SYMMES, OF SHERBROOKE, QUEBEC, CANADA.

HAY OR GRAIN COCK WEATHER-SHIELDS.

SPECIFICATION forming part of Letters Patent No. 388,795, dated August 28, 1888.

Application filed July 22, 1887. Serial No. 244,996. (No model.) Patented in Canada April 5, 1887, No. 26,400, and in England May 6, 1887, No. 6,690.

*To all whom it may concern:*

Be it known that we, JOHN ALBERT SYMMES and LUTHER RICHARDSON SYMMES, both of Sherbrooke, in the Province of Quebec, in the Dominion of Canada, have jointly invented certain new and useful Improvements in Hay and Grain Cock Weather-Shields; and we do hereby declare that the following is a full, clear, and exact description of the same, reference being had to the annexed drawings, in which—

Figure 1 represents our improved weather-shield applied to a hay-cock, and Fig. 2 is a like view showing our improved weather-shield having radial corrugations.

Our invention has for its object to provide a rigid water-proof cover which will be durable, cheap, and readily applied by children (of sufficient stature) to protect hay-cocks and grain-stacks in the field from the effects of rain, and capable of being compactly nested together for stowage when not in use and for transportation, and not requiring to be held by ropes and pegs, except in cases of a prospective hurricane, when two ropes will, in most cases, hold the cover from being blown off the top of the cock or stack, and also to allow of circulation of air under the cover when applied to a hay cock or stack, to prevent mildew and to allow of the hay being cut somewhat green and cured in the cock, thereby making the fodder more nutritious.

Our invention consists of a concavo convex cover made of paper-pulp, and subsequently waterproofed, or painted on the outside, whereby a rigid seamless cap or cover is produced, adapted without adjustment to be laid upon the top of a hay-cock or grain-stack to shield the same from the injurious effects of rain; and, preferably, said cover has radial corrugations to allow of increased circulation of air underneath, and holes near the circumferential edge to admit of cords being attached thereto and to pegs to be driven into the ground to keep the cover in position on the hay-cock or grain-stack during a hurricane.

A is a seamless shield or cover, of concavo-convex form or saucer-shaped, as may be desired, made of paper-pulp, molded in a wet or moist state between dies and dried, whereby the shield will be rigid; and when dried the shield is waterproofed, or painted on the outside, to shed rain falling thereon and prevent absorption, whereby the cover or shield would become soft or get out of shape and be liable to destruction if handled when saturated with water. The cover is formed to cap the top of a hay-cock or grain-stack, and may have two holes punched near the circumferential edge, to be equidistant apart, to tie cords B, which are attached to pegs C, to be driven into the ground to secure the cover from being blown off during a hurricane; but at other times with this form of cap the wind will have the effect of pressing the cover down onto the top of the cock or stack, whereby the use of cords and pegs will not be necessary or advisable.

Preferably the cover is formed with radial corrugations D, as shown in Fig. 2, to allow of more circulation of air under the cover, so that the hay or grain will not mildew, should the cover be applied for a considerable time; and by the use of our cover or shield hay may be cut somewhat green and cured in the cock, whereby the fodder will be more nutritious and command a higher market price than it would were other known covers used.

Being made of paper-pulp, the cover or shield can be cheaply manufactured, as the material is the cheapest known for such purpose, and, when finished, combines lightness with durability.

Preferably the cover or shield is flattened at the apex, as in A'; but, if desired, it may be concavo-convex throughout, as in A, the difference in form being of no practical importance in their case, although we have found from experience that the corrugated form of cover with flattened top is more readily molded and the cover is less liable to defects in manufacture.

Our improved cover or shield being uniformly made to a certain shape, a number of them can be nested together when not in use or for transportation, without occupying much space, and from their lightness and rigidity they can be applied in the field by children of sufficient stature, thus saving the increased expense of maturer labor necessary in covers now in use; and as the covers will not under the usual condition of the atmosphere require the use of ropes they can be applied with great speed, thereby saving valuable time in view of an approaching storm.

The shield or cover being rigid requires but two cords to hold it in position, and pegging can be performed more quickly than with flexible covers which require a larger number.

We claim as our invention—

1. A cover for hay-cocks or grain-stacks, consisting of a rigid water-proof shield, of concavo-convex shape, formed, without a seam, of paper-pulp, substantially as described and shown.

2. A cover for hay-cocks or grain-stacks, consisting of a rigid seamless radially-corrugated water-proof paper-pulp shield of concavo-convex shape, substantially as described and shown.

JOHN A. SYMMES.
LUTHER R. SYMMES.

Witnesses:
ALBERT SCOTT,
P. DILLON,
H. A. ELKINS.